W. H. RIDER.
Corn-Marker.

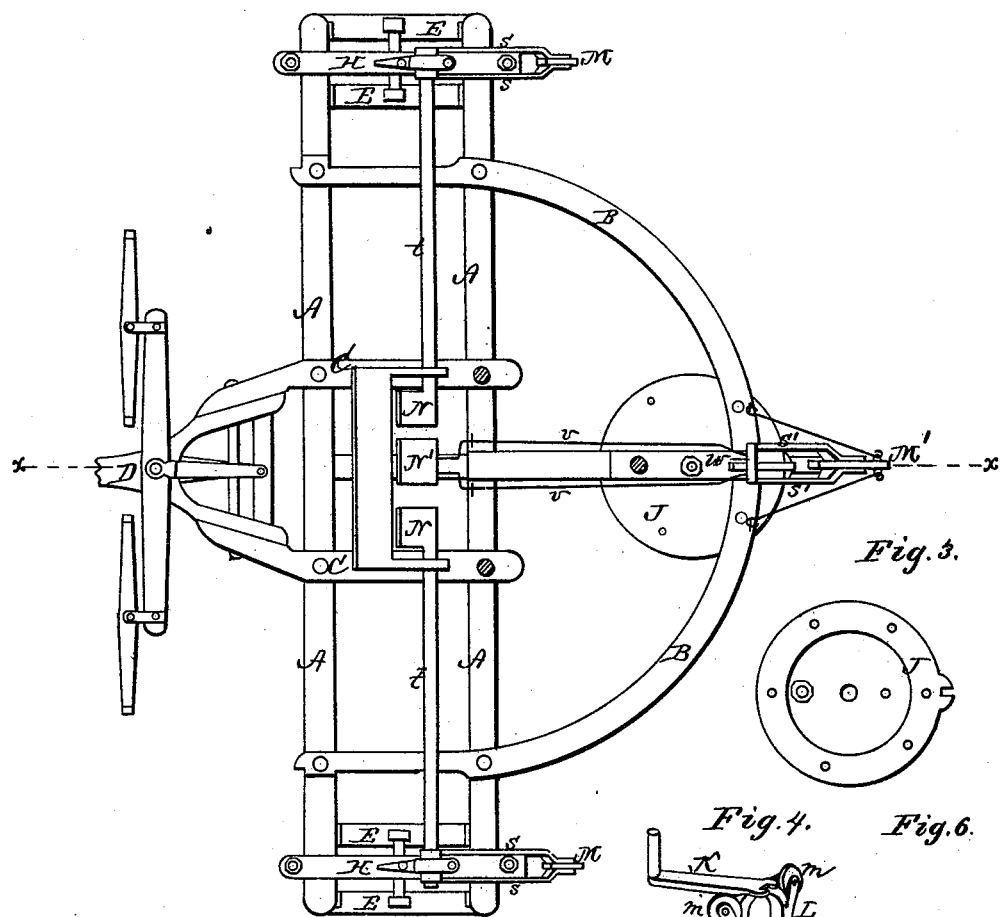
W. H. RIDER.
Corn-Marker.
No. 166,939.  Patented Aug. 24, 1875.
2 Sheets--Sheet 1.
Fig. 1.
Fig. 3.
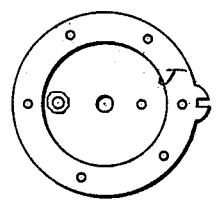
Fig. 4. Fig. 6.
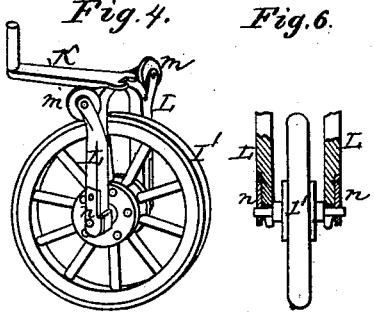
Fig. 5.
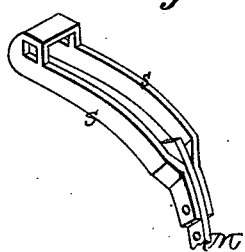
WITNESSES
Henry N. Miller
C. L. Evert
INVENTOR
Wm. H. Rider
By Alexander Mason
Attorney 2 Sheets--Sheet 2.

No. 166,939.

Patented Aug. 24, 1875.

WITNESSES
Henry N. Miller
C. L. Evert

INVENTOR
Wm H. Rider,
By Alexander Mason
Attorney

UNITED STATES PATENT OFFICE.

WILLIAM H. RIDER, OF PLUM HOLLOW, IOWA, ASSIGNOR TO HIMSELF, LEVY SHIRLEY, AND A. D. KING, OF SAME PLACE.

IMPROVEMENT IN CORN-MARKERS.

Specification forming part of Letters Patent No. 166,939, dated August 24, 1875; application filed April 13, 1875.

*To all whom it may concern:*

Be it known that I, WILLIAM H. RIDER, of Plum Hollow, in the county of Fremont and in the State of Iowa, have invented certain new and useful Improvements in Shifting Triangular Marker; and do hereby declare that the following is a full, clear, and exact description thereof, reference being had to the accompanying drawings, and to the letters of reference marked thereon, making a part of this specification.

The nature of my invention consists in the construction and arrangement of a machine for marking off land for corn-planting, as will be hereinafter more fully set forth.

In order to enable others skilled in the art to which my invention appertains to make and use the same, I will now proceed to describe its construction and operation, referring to the annexed drawings, in which—

Figure 2:
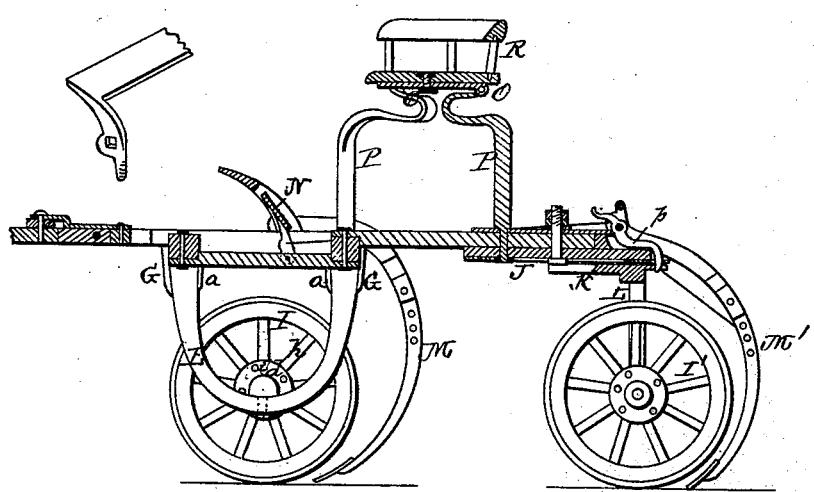
Figure 7:
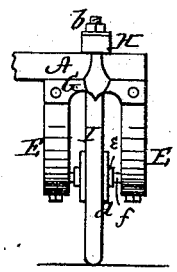

Figure 1 is a plan view of my marker. Fig. 2 is a vertical section of the same through the line $x$ $x$, Fig. 1. Figs. 3, 4, 5, 6, and 7 are detached views of certain parts thereof.

A A represent two parallel bars, connected by the ends of a semicircle, B, being secured on the top thereof. To the bars A A are also secured the hounds C C, between the front ends of which the tongue D is pivoted in the ordinary manner. At each end of the frame thus constructed is fastened a wheel-frame, consisting of two parallel semicircular irons or bars, E E, connected at their ends on the outer sides with T-irons G G, and each bar has at each end on the inner side a flange, $a$, projecting upward for a suitable distance. The upper end of each T-iron forms a bolt, which passes up through a bar, H, placed on top across the bars A A, and nuts $b$ $b$ are screwed on said bolts, thus forming a clamp for holding the bars E to the main frame. The flanges $a$ project on the inner sides of the main bars A A, and the vertical arms of the T-irons project on the outer sides of said bars, the ends of the curved bars E coming against the under sides of the main bars A, and the cross-bar H binding on top when the nuts $b$ are screwed up. By loosening the nuts $b$ the wheel-frame thus constructed can be moved out or in, as required, so as to mark at any distance from the center-wheel, hereinafter described. I is the wheel, placed in the frame E E, and having its axle revolving in suitable boxes attached to the frame. This wheel is composed of two iron plates, $d$, one on each side of the wheel, the shaft or axle $f$ passing through them and fastened by means of a burr, $e$, on each side of the wheel. The spokes $h$ are arranged between these plates in arch form, self-supporting, so as not to require either hub or mortises for the spokes. The plates are fastened by the burrs $e$, and also by a bolt, $i$, between every other spoke, which binds the spokes together, said bolts $i$ to be as far from the center as possible.

In this manner a farmer can tighten the spokes by means of the burrs; and also enables the workman to make perfect repairs by any number of spokes without removing the tire, simply by removing one of the iron plates.

J represents the rear circle, under which the rear or circle caster-wheel I′ operates. In the center of the circle J is pivoted an arm, K, provided with two friction-rollers, $m$ $m$, to bear against the under side of the circle; and from the outer end of the arm K project two vertical parallel arms L L. In the lower ends the axle of the wheel I′ is inserted and held by means of springs $n$ $n$. The wheel I′ is constructed in the same manner as described for the wheels I, and it can easily be removed by raising the side springs $n$. In the extreme end of the horizontal arm K is a notch, into which drops a latch, $p$, for holding the caster-wheel frame rigid, and prevent its turning on the pivot. Behind each of the side wheels I is a plow, M, adjustably attached to two straps or arms, $s$ $s$, the upper forward ends of which are formed with square holes or sockets to fit over a square rod, $t$, which is placed in suitable bearings on the cross-bar H and hound C, and is at its inner end provided with a foot-treadle, N. M′ is a similar plow behind the center-wheel I′. The straps $s'$, to which the same is connected, are united and pivoted on top of the circle B, forming a loop, $w$, which, by rods $v$ $v$, is connected to a foot-treadle, N′, situated between the two treadles N N.

By means of the various treadles the plows may be inserted into the ground or thrown out at the option of the driver, the loop $w$, at the same time as the center plow is raised, raising the latch $p$, to allow the wheel I' to turn in either direction, as may be required. When the lock or latch is in place the marker will go straight, and by raising the latch the wheel moves around on the friction-wheels $m$, enabling the machine to be turned in a small space, and immediately after coming around straight the latch again takes its place and guides the marker in a straight line.

It will be noticed that the bearings of the wheels or runners on the ground are placed in a triangular form, and by this means allowing each wheel or runner to lower or rise, according to the unevenness of the ground, each wheel operating independent of each other without changing the width of the rows.

O O represent the seat-springs, bolted or otherwise attached to uprights P P. These springs support each other by a parallel pressure, and also by a perpendicular pressure, the seat R being either stationary or revolving thereon.

Having thus fully described my invention, what I claim as new, and desire to secure by Letters Patent, is—

1. The combination of the two bars A A, separated from each other, and the wheel-frame, consisting of the curved bars E E, provided with T-irons G G and flanges $a\ a$, the cross-bar H, and nuts $b\ b$, whereby the wheels are capable of being moved inward or outward on the bars A A, all constructed substantially as and for the purposes herein set forth.

2. In combination with the bars A A, the laterally-adjustable wheels I, and the shaft $t$ with treadle N, the plow M, connected to the straps $s\ s$ and to the bar H, and laterally adjustable, in conjunction with the wheel I, all substantially as set forth.

3. The combination, with the circle J, of the pivoted bar K, with vertical arms L L, the friction-rollers $m\ m$, latch $p$, wheel I', and springs $n\ n$, all substantially as and for the purposes herein set forth.

4. The combination, with the swiveled wheel I' and latch $p$, of the plow M', connected and pivoted straps $s'\ s'$, loop $w$, rods $v\ v$, and foot-treadle N', all substantially as and for the purposes herein set forth.

In testimony that I claim the foregoing I have hereunto set my hand this 25th day of March, 1875.

WILLIAM H. RIDER.

Witnesses:
W. A. SKINKLE,
W. R. PAUL.